J. W. KENEVEL.
VALVE CONTROLLING MEANS.
APPLICATION FILED JUNE 13, 1907.

901,712.

Patented Oct. 20, 1908.

Witnesses:
William H. Rivois
Augustus B. Coppes

Inventor.
Jeanrot W. Kenevel,
by his Attorneys,
Howson & Howson

UNITED STATES PATENT OFFICE.

JEANNOT W. KENEVEL, OF PHILADELPHIA, PENNSYLVANIA.

VALVE-CONTROLLING MEANS.

No. 901,712.  Specification of Letters Patent.  Patented Oct. 20, 1908.

Application filed June 13, 1907. Serial No. 378,757.

*To all whom it may concern:*

Be it known that I, JEANNOT W. KENEVEL, a citizen of the United States, residing in Philadelphia, Pennsylvania, have invented Improved Valve-Controlling Means, of which the following is a specification.

The object of my invention is to provide means for automatically regulating the supply of fluid or liquid bodies by variations of the temperature. For instance, my invention may be employed in connection with the operation of a refrigerating plant for the purpose of regulating the passage of ammonia to and controlling the operation of the compressor. It will be understood, however, that with but slight modifications, without materially altering the structure embodying my invention, it may be applied for the purpose of regulating the passage of fluid or liquid in connection with a heating apparatus, instead of a cooling apparatus.

Figure 1:
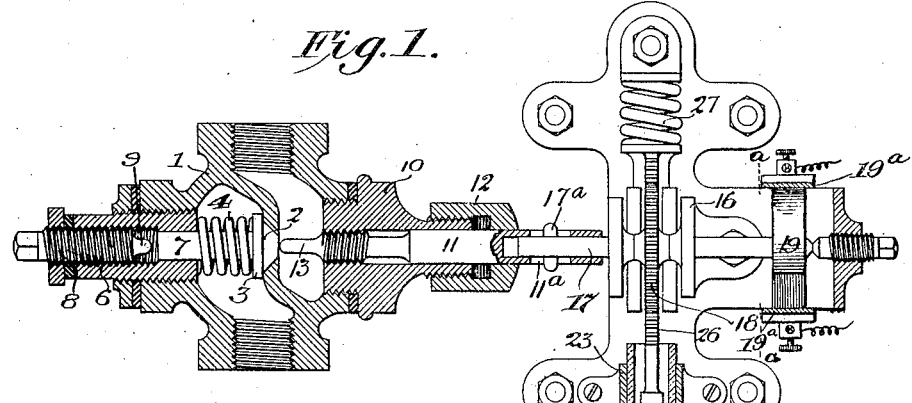
Figure 2:
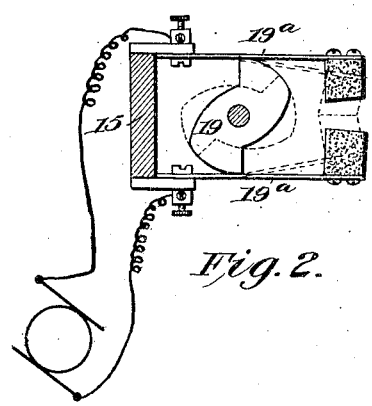
Figure 2:
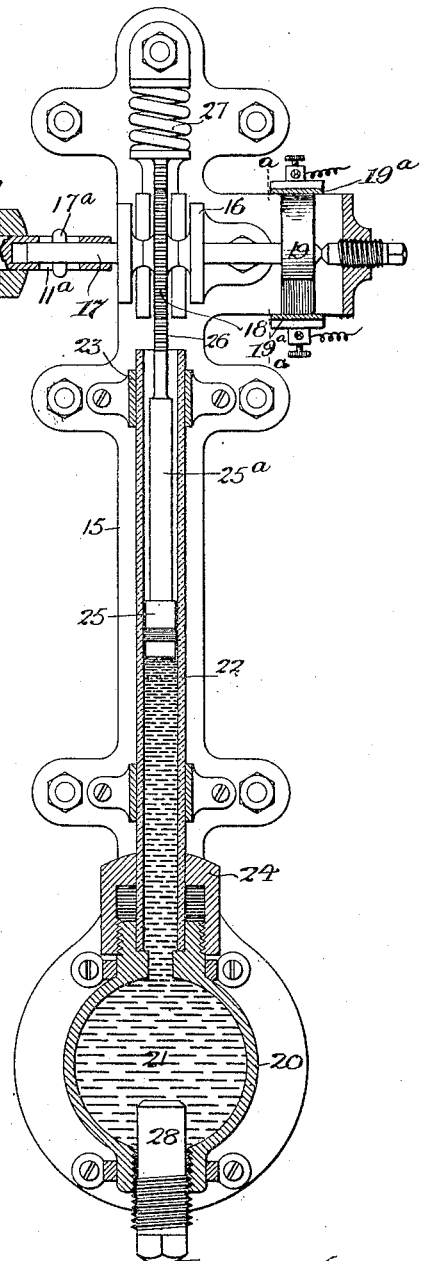

My invention is fully shown in the accompanying drawing, in which:

Figure 1, is an elevation, partly in section, of the mechanism forming the subject of my invention, and Fig. 2, is a sectional view on the line *a—a*, Fig. 1, illustrating a detail of the same.

In the drawing, 1 represents a valve casing having a seat 2 for a valve 3; such valve being held to its seat by a suitable spring 4, and in the present instance this valve is arranged to control the passage of ammonia to the compressor of the refrigerating apparatus. The valve casing is provided with a sleeve plug 6, in which the stem 7 of the valve is slidably mounted, and the bore of said sleeve is suitably packed and closed by a screw plug 8 having an end 9 for engagement with the valve stem; such plug being adjustable and serving to regulate or limit the movement of said valve stem, and consequently the movement of said valve from its seat. The opposite side of the valve casing carries a bonnet 10 in which is mounted a suitable threaded stem 11; the bonnet being provided with a gland 12 whereby said stem may be suitably packed. The stem 11 carries a projecting end 13, the normal position of which is just out of contact with the valve 3 when the latter is seated.

The valve casing and the parts just described may be disposed in proper relation to a bracket 15 having ears 16 in which is journaled a spindle 17 carrying a pinion 18. This spindle also carries a circuit breaker 19 in engagement with spring arm contacts 19ª whereby electrical connection may be made and broken by the turning of said spindle for controlling the operation of a compressor. The spindle 17 is connected to the stem 11 in such manner that it may turn said stem and at the same time permit the latter to move longitudinally with respect thereto; the stem being bored to receive said spindle and having slots 11ª adapted to accommodate a pin 17ª carried by the spindle 17.

Carried by the bracket 15 is a vessel 20 containing a body of expanding fluid 21 and having a tubular extension 22 which may be made of glass or other material. The extension 22 is suitably supported by sleeves or collars 23 secured to said bracket 15 and its joint with the vessel 20 is suitably packed and retained by a gland 24. The body of expanding fluid within this extension stands normally about midway of the height of the same, and resting on the body of expanding fluid is a piston 25 carried by a rod 25ª. This plunger is suitably packed so as to fill the interior of such extension, and carries at its upper end a racked portion 26 for engagement with the pinion 18 carried by the spindle 17. This rack and piston are maintained in normal position with relation to the pinion and the body of expanding fluid, by means of a spring 27, upon which the body of expanding fluid tends to react by its expansion due to a rise in temperature, but when the temperature is lowered the spring will cause the piston to return to its normal position.

In order to maintain the piston and its rack in proper relative position with relation to the pinion, the vessel containing the expanding fluid is provided with a regulating plug 28 having an end for engagement by a suitable tool whereby it may be moved in and out of the chamber of said vessel and thereby displace a sufficient quantity of the body of expanding fluid to dispose the piston in its proper position. The vessel 20 is supported in place by the collars 29.

The operation of the structure is quite simple and is substantially as follows: Sufficient cold having been generated by the compression of the ammonia, the parts are substantially in the position shown in the drawing. Should the temperature rise, however, such rise will affect the body of expanding fluid within the vessel 20, causing the same to expand, and such expansion will raise the piston within the extension of such vessel, lifting the rack 26 with it, and the latter coacting with the pinion 18 carried by the spindle 17 will turn the stem or rod 11. The latter having a threaded portion, such turning will effect a longitudinal movement of the same with its tip 13 engaging the valve 3, and the latter will be moved from its seat permitting the passage of ammonia to the compressor. The same action of the spindle shifts the circuit breaker 19 so as to make the proper electrical connections, and the compressor will be started, effecting in a short while further compression of the ammonia and a consequent reduction in the temperature. When this takes place, the expanding fluid will fall, the several parts will be replaced and the valve 3 close. Mercury or any other form of fluid expanding and contracting under varying degrees of temperature may be employed.

I claim:

1. The combination of a valve, means for maintaining the same in one position, a rotatable stem adapted to engage said valve and movable longitudinally when rotated in engagement with said valve, and means controlled by the temperature for rotating said stem to effect a change in the position of said valve.

2. The combination of a valve, means for maintaining the same in one position, a longitudinally movable stem in engagement with said valve and serving to effect a change in the position of said valve when moved in one direction, and to permit closing of the valve when moved in the opposite direction, a movable spindle in engagement with said stem, a pinion carried by said spindle, a rack in engagement with said pinion, a piston carried by said rack, a body of expanding fluid for moving said rack in one direction, and means for moving the rack in the opposite direction when released from the influence of the expanding fluid.

3. The combination of a valve, means for maintaining the same in a closed position, a motor, circuit closing means for starting said motor, a rotatable stem in engagement with the valve, said stem also carrying circuit closing means, and means controlled by the temperature for operating said stem and simultaneously closing the circuit to start the motor.

4. The combination of a valve, means for maintaining the same in a closed position, a rotatable stem adapted to engage said valve and movable longitudinally when rotated in engagement with said valve, and means controlled by the temperature for rotating said stem to open the valve.

5. The combination of a valve, means for maintaining the same in closed position, a longitudinally movable stem in engagement with said valve and serving to open the valve when moved in one direction, and to permit closing of the valve when moved in the opposite direction, a movable spindle in engagement with said stem, a pinion carried by said spindle, a rack in engagement with said pinion, a piston carried by said rack, a body of mercury for moving said rack in one direction, and means for moving the rack in the opposite direction when released from the influence of the mercury.

In testimony whereof, I have signed my name to this specification, in the presence of two subscribing witnesses.

JEANNOT W. KENEVEL.

Witnesses:
MURRAY C. BOYER,
ARTHUR J. PURSSELL.